J. L. BOND.
Corn Planter.

No. 107,156.

Patented Sept. 6, 1870.

Witnesses:
F. Lehmann
C. L. Everts

Inventor:
Joel L. Bond
per Alexander Mason
Atty

UNITED STATES PATENT OFFICE.

JOEL L. BOND, OF MARSHALLTOWN, IOWA.

IMPROVEMENT IN CORN-PLANTERS.

Specification forming part of Letters Patent No. 107,156, dated September 6, 1870; antedated August 27, 1870.

*To all whom it may concern:*

Be it known that I, JOEL L. BOND, of Marshalltown, in the county of Marshall, and in the State of Iowa, have invented certain new and useful Improvements in Corn-Planters; and I do hereby declare that the following is a full, clear, and exact description thereof, reference being had to the accompanying drawings, and to the letters of reference marked thereon, making a part of this specification.

The nature of my invention consists in the construction and arrangement of a device for planting corn, which device can be attached to any plow desired.

In order to enable others skilled in the art to which my invention appertains to make and use the same, I will now proceed to describe its construction and operation, referring to the annexed drawings, in which—

Figure 1:
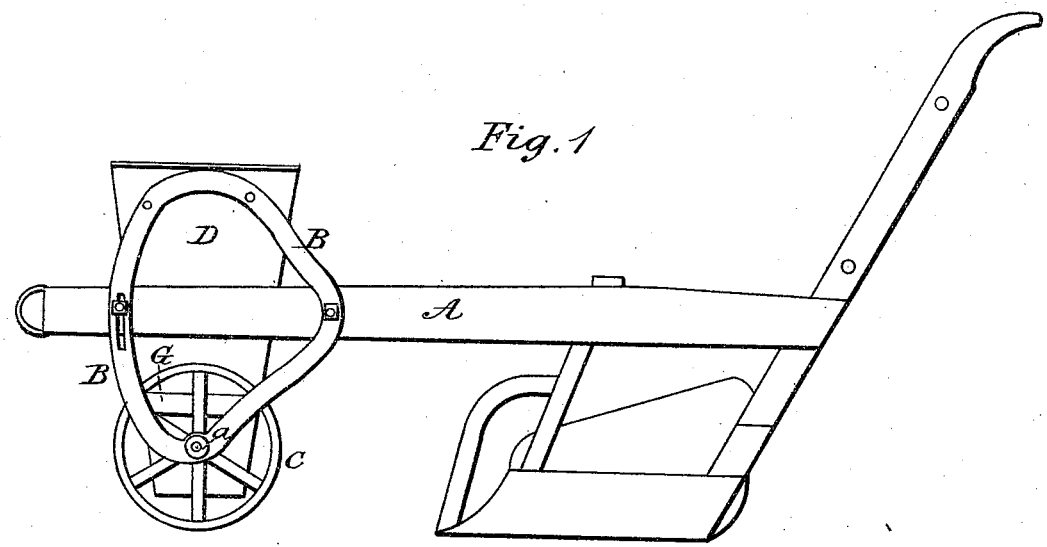
Figure 2:
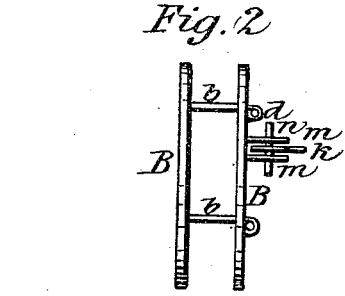
Figure 3:
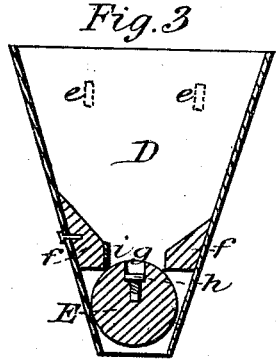
Figure 4:
Figure 5:

Figure 1 is a side elevation of a plow with my device attached. Fig. 2 is a plan view of the bars which form bearings for the gage-wheel and support the corn-hopper. Fig. 3 is a longitudinal vertical section of the corn-hopper. Fig. 4 is an inside view of the hub or collar in which the axle of the gage-wheel is placed to operate the planter. Fig. 5 is a side view of said axle of the gage-wheel.

A represents the beam of a plow, which is on each side, at the front end, provided with a curved bar, B, of the peculiar shape shown in Fig. 1. The bars B B are pivoted to the beam A at their rear ends, and secured by a bolt passing through elongated slots in their front sides, so that they can be raised or lowered at will. Through the lower ends of the bars B B passes an axle, $a$, upon which is placed the wheel C, said wheel, by the adjustment of the bars B B, gaging or regulating the depth at which the plow will work. Above the beam A the bars B B are connected by means of pins $b\ b$, which on one side form eyes or loops $d\ d$ for the purpose of suspending the corn-hopper D by means of the hooks $e\ e$ on its side. Inside of the hopper D are placed inclines $f f$, forming a passage for the corn, under which is placed a wheel, E, having an aperture or hole, $g$, for receiving the grain of corn, and as the wheel revolves carry the grain out and deposit it in the ground. In the hole $g$ is a screw, $h$, by means of which the size of said cavity is increased or diminished at will, so as to regulate the amount of corn to be dropped at each revolution of the wheel. On one of the inclines $f$ is secured a brush, $i$, to separate the corn as the wheel turns around, and this incline and brush can be raised and lowered at will, they being secured by a screw passing through an elongated slot in the side of the hopper, as shown in Fig. 3.

The hopper D is attached to the bars B B in the following manner: The hooks $e\ e$ are inserted in the eyes $d\ d$, and an ear, $k$, on the side of the hopper, is inserted between two ears, $m\ m$, projecting from a cross-bar, G, on one of the curved bars B. The ear $k$ is secured between the ears $m\ m$ by means of a spring-key, $n$. At the same time the end of the axle $a$, which is forked, as shown in Fig. 5, passes into a collar or socket, $p$, formed on the end of the axle which carries the grain-dropping wheel E. At the inner end of this collar or socket is a pin or bar, $s$, around which the forked end of the shaft $a$ fits, and thus, when the plow is in motion and the gage-wheel C revolves, the dropper is put in operation.

The machine is thrown in and out of gear by means of the spring-key $n$, there being two holes in the ear $k$, so that the lower end of the hopper can be moved slightly outward and the key inserted in the outside hole, when the forked end of the shaft $a$ will not grasp the pin $s$, and consequently not operate the hopper. By moving the hopper inward and passing the key through the inner hole the shaft $a$ is thrown in gear with the pin $s$.

The plow is run in every third furrow and turns the fine dirt over the corn, leaving the corn at the edge of the sod.

The dropper can be attached to a breaking-plow and drop every third round.

Having thus fully described my invention, what I claim as new, and desire to secure by Letters Patent, is—

1. The arrangement of the two curved bars B B, made adjustable, as described, and carrying the gage-wheel C, substantially as and for the purposes herein set forth.

2. The hopper D, suspended at the side of one of the bars B by means of the hooks $e\ e$ and eyes $d\ d$, which can be fixed or removed by means of the ears $k$ and $m\ m$ and spring-key $n$, substantially as and for the purposes herein set forth.

3. The combination of the forked axle *a*, collar or socket *p*, and pin *s*, all substantially as and for the purposes herein set forth.

4. The removable incline *f*, provided with the brush *i*, substantially as and for the purposes herein set forth.

5. The arrangement within the hopper D of the inclines *f f*, brush *i*, and wheel E, with cavity *g* and screw *h*, all substantially as shown and described.

6. The combination of the adjustable bars B B, gage-wheel C, and hopper D, all constructed and arranged as described, and operating substantially in the manner and for the purposes herein set forth.

In testimony that I claim the foregoing I have hereunto set my hand this 21st day of December, 1869.

JOEL L. BOND.

Witnesses:
JOHN CARTER,
J. H. DAVIS.